(12) United States Patent
Kodukula et al.

(10) Patent No.: US 6,195,053 B1
(45) Date of Patent: Feb. 27, 2001

(54) ANTENNA, MODULE AND IMAGER, SUCH AS FOR A BARCODE READER

(75) Inventors: Venkata S. R. Kodukula, Yorktown Heights, NY (US); H. Sprague Ackley, Seattle, WA (US)

(73) Assignee: Intermec IP Corp., Beverly Hills, CA (US)

( * ) Notice: Subject to any disclaimer, the term of this patent is extended or adjusted under 35 U.S.C. 154(b) by 0 days.

(21) Appl. No.: 09/362,508

(22) Filed: Jul. 27, 1999

(51) Int. Cl.⁷ ............................. H01Q 1/24; G06K 7/10
(52) U.S. Cl. ............... 343/702; 235/472.01; 235/462.47
(58) Field of Search .................... 343/702, 700 MS, 343/741, 866; 235/472.01; 455/90

(56) References Cited

U.S. PATENT DOCUMENTS

| 2,256,803 | * | 9/1941 | Hauser | 343/702 |
| 5,382,784 | | 1/1995 | Eberhardt. | |
| 5,555,459 | * | 9/1996 | Kraus et al. | 343/702 |
| 5,943,022 | * | 8/1999 | Massey | 343/744 |
| 6,003,775 | * | 12/1999 | Ackley | 235/472.01 |

* cited by examiner

*Primary Examiner*—Don Wong
*Assistant Examiner*—James Clinger
(74) *Attorney, Agent, or Firm*—Perkins Coie LLP

(57) ABSTRACT

A symbology reader includes an optical reading assembly received in a reading assembly housing and an antenna shaped to conform to at least a portion of the reading assembly housing and in contact therewith. The antenna can be shaped to form at least a partial enclosure for the optical reading assembly, thus eliminating part or all of the reading housing assembly. A module for use in an imager can include an optical reading assembly mounted in a housing and an antenna having a shape that is complimentary to a shape of at least a portion of the housing. Similarly, an antenna for an imager can include a conductive member having a shape at least partially conforming to a shape of a reading assembly housing in an imager.

12 Claims, 4 Drawing Sheets

ANTENNA, MODULE AND IMAGER, SUCH AS FOR A BARCODE READER

FIELD OF THE INVENTION

The present invention generally relates imagers, for example, symbology readers for reading machine-readable symbologies such as barcode, stacked and area code symbols.

BACKGROUND OF THE INVENTION

Size and weight are major concerns in electronic devices. Symbology readers such as barcode scanners, typically house antennas and optical character set reading assemblies as separate components. Each component employs its own support and/or housing resulting in a bulky and heavy structure. This increase in weight and size makes the device unwieldy, and increases manufacturing costs. Even in devices not intended to be portable, separate housing of components unnecessarily reduces available space. Additional components may have to be omitted due to the lack of space.

SUMMARY OF THE INVENTION

The present apparatus and method solves these problems and other problems by configuring an antenna so as to complement an optical reading assembly. In this way, the device may be made more "efficient." In other words, the antenna may be formed so as to utilize the space adjacent to the optical reading assembly to conserve space. Additionally, the antenna may utilize the structure of the optical character set reading assembly so that the need for a separate support and housing is eliminated. Manufacturing costs may be lowered by the resulting simplification of the manufacturing process, such as eliminating the need for separate production lines and facilities. By utilizing aspects of this invention, a device that requires these features may have increased portability yet still be less expensive to produce. Additional features may be added to the device due to the additional space contained in the unit made possible by the use of aspects of this invention. This makes the device more desirable to consumers and therefore more marketable. For the forgoing reasons, there is a need for a device capable of serving as an optical reading assembly and antenna.

In a first aspect of the present invention, a symbology reader has an optical reading assembly received in a reading assembly housing and an antenna shaped to conform to at least a portion of the reading assembly housing and in contact therewith.

In another aspect of the present invention, an imager has an antenna shaped to form at least a partial enclosure for the optical reading assembly.

In a further aspect of the present invention, a module is provided for use in an imager, the module having an optical reading assembly mounted in a housing and an antenna having a shape that is complimentary to a shape of at least a portion of the housing.

In yet a further aspect of the present invention, an antenna includes a conductive member having a shape at least partially conforming to a shape of a reading assembly housing in an imager.

It is to be understood that both the forgoing general description and the following detailed description are illustrated and explanatory only and are not restrictive to the invention as claimed. The accompanying drawings, which are incorporated in and constitute a part of the specification, illustrate embodiments of the invention and together with the general description, serve to explain principles of the invention.

BRIEF DESCRIPTION OF THE DRAWINGS

Numerous advantages of the present invention may be better understood by those skilled in the art by reference to the accompanying figures in which.

DETAILED DESCRIPTION OF THE INVENTION

Figure 1:
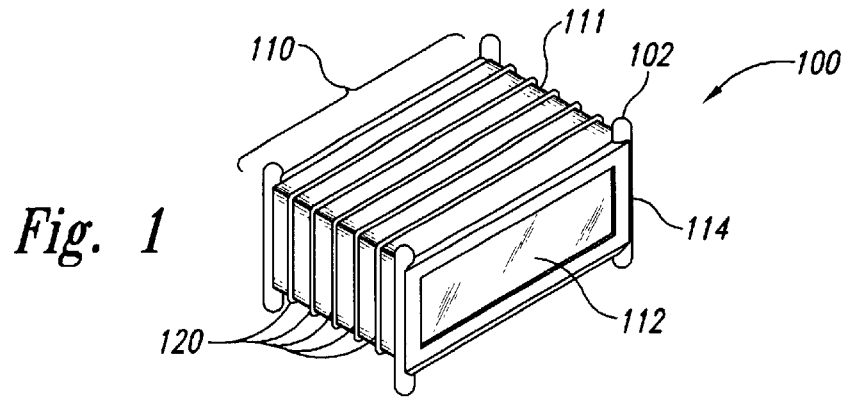
FIG. 1 is a front, top isometric drawing of an illustrated embodiment of an optical reading assembly in a reading assembly housing and a coil antenna wrapped around a portion of the reading assembly housing.

Reference will now be made in detail to illustrated embodiments of the invention, examples of which are illustrated in the accompanying drawings.

In the following description, certain specific details are set forth in order to provide a thorough understanding of various embodiments of the invention. However, one skilled in the art will understand that the invention may be practiced without these details. In other instances, well-known structures associated with symbology readers, optical scanners, antennas and wireless communications systems have not been shown or described in detail to avoid unnecessarily obscuring descriptions of the embodiments of the invention.

Optical reading assemblies are comprised of components for reading optical indicia. For example, an optical reading assembly may include a scanner engine or any other type of optical module which illuminates (or receives reflected ambient light from) optical indicia, such as code elements, characters, or traditional character fonts with a light source, and focuses the reflected area image through an optical lens system onto an imaging device. The image may be converted from a sensed area signal to a digital signal which may then be stored, manipulated and processed by logic circuits as an image to identify the information content. Additionally, a housing structure such as a reading assembly housing may be included to contain and protect the aforementioned imaging components. Vibration enclosures may also be utilized to steady the components so that a more accurate reading is taken. The assembly may be attached to a desired device with the use of elastomeric mounts so as to further protect and steady the imaging components. Optical reading assemblies may be used in, for example, bar code readers, optical character recognition systems, stacked bar code readers, optical scanners, holographic reading assemblies, personal digital assistants, etc. These devices may be hand held or mounted in a console.

Antennas may serve to increase the reception and transmission of electromagnetic radiation. For example, antennas may be utilized to receive radio waves, such as in a typical radio transmittal device or radio frequency tag identification reader. Antennas may be formed in a variety of shapes, such as coiled, formed in strips, layered, made collapsible, wound, etc. These shapes, when combined with an optical character set reading assembly, may increase the efficiency of the apparatus. The efficiencies may include conserving space, weight and expense. Space may be conserved by forming the antenna in a complementary shape so as to minimize the need for additional space. Weight may be conserved by forming the antenna in a complementary shape so as to eliminate the need for separate structures for the antenna and optical reading assembly. For example, an antenna may be formed so that a separate housing or support structure is no longer needed. Expense may be conserved by producing or shipping the device as one unit. For example, the need for separate manufacturing processes may be eliminated so that the device may be produced on one assembly line. Antennas may be formed in a variety of shapes and still not depart from aspects of the present invention. It is believed that it will be apparent that various changes may be made in the form, construction and arrangement of the components thereof without departing from the scope and spirit of the invention or without sacrificing all of its material advantages, the form herein described being merely an explanatory embodiment thereof.

Referring now generally to FIGS. 1 through 5, a number of illustrated embodiments will be discussed. In FIG. 1, an illustrated embodiment of the present invention is shown. An optical reading assembly 110 includes a reading assembly housing 111 with an optical window 112, and has an antenna 120 disposed proximally to the optical reading assembly 110. This illustrated embodiment 100 utilizes the structure of the optical reading assembly (e.g., reading assembly housing 111) for two purposes, both to house the optical reading assembly 110 and to support the antenna 120 which is coiled about the optical reading assembly 110. Elastomeric mounts 102 may be utilized to steady and protect the device. It may be useful, for example, to employ this invention in a hand held optical scanner and radio frequency identification tag reader. For example, the antenna may be utilized by a radio frequency identification assembly for the identification of radio frequency identification tags. When utilized together, the device may detect, interrogate, etc. radio frequency identification transponders and optical indicia. For example, the device may be capable of reading optical indica by utilizing the optical reading assembly and query radio frequency identification transponders by utilizing a radio frequency identification assembly. This device may be useful in a variety of applications, including but not limited to inventory, shipping, packaging, retail sales, and security.

Figure 2:
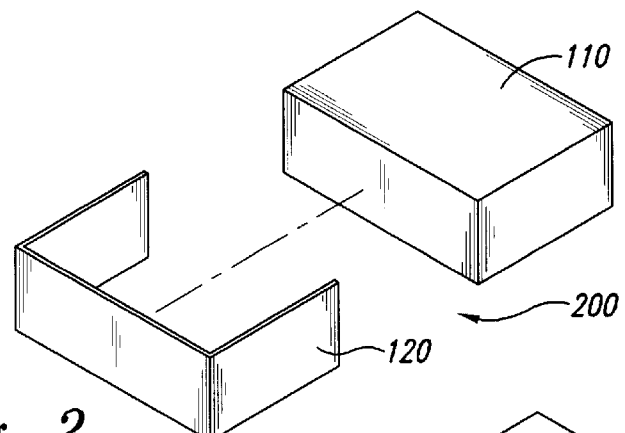
FIG. 2 is a rear, top, isometric drawing of an illustrated embodiment of the optical reading assembly in the reading assembly housing and a U-shaped antenna sized to receive the reading assembly housing.

Referring now to FIG. 2, a second illustrated embodiment of the present invention is shown. An antenna 120 is shown as a strip disposed proximally to the optical reading assembly 110, more specifically as a U-shaped bracket sized and dimensioned to receive the reading assembly housing 111. Thus, the antenna 120 is formed so that it complements the shape of the optical reading assembly housing 11.

Figure 3A:
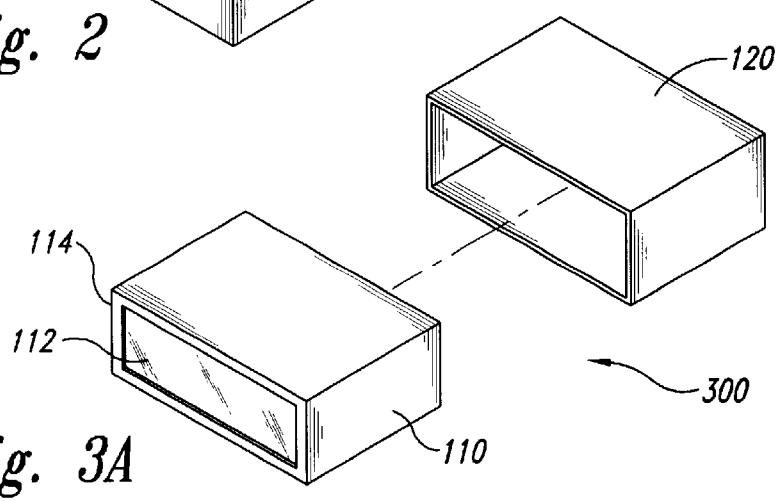
FIG. 3A is a front, top isometric drawing of an illustrated embodiment of the present invention wherein the antenna is formed as a sleeve that receives the reading assembly housing.

In FIG. 3A, an antenna 120 is formed as a sleeve into which the optical reading assembly 110 may be placed. In this illustrated embodiment, the antenna 120 encloses part of the optical reading assembly 110. The antenna 120 is formed so as to more efficiently utilize the space proximal to the optical reading assembly 110. An opening may be formed in the antenna sleeve 120 for an optical window 112 on the optical reading assembly 110 so that it may retain functionality when placed into the antenna 120, as shown by the broken line in FIG. 3A. In this embodiment, the optical reading assembly 110 and antenna 300 have increased efficiency by conserving space while eliminating the need for separate support and housing structures. By combining these components, space may be conserved so that more features may be added to the device, thereby increasing functionality and marketing potential. Additionally, the antenna 120 can serve as a support structure for the optical reading assembly 110.

Figure 3B:
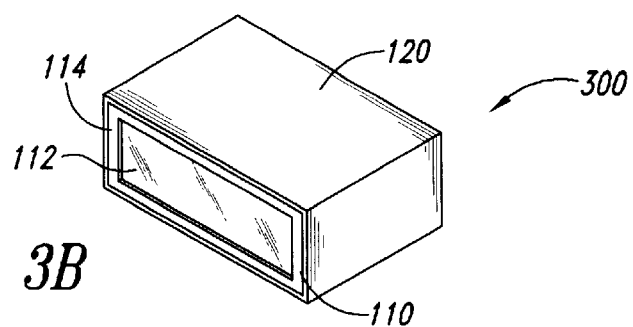
FIG. 3B is a front, top isometric drawing of an illustrated embodiment of the present invention where the antenna forms a portion of the reading assembly housing.

In FIG. 3B, the antenna 120 is a substantially planer member, that forms a top of an enclosure. Thus, the antenna 120 forms a portion of the reading assembly housing 111.

Figure 4:
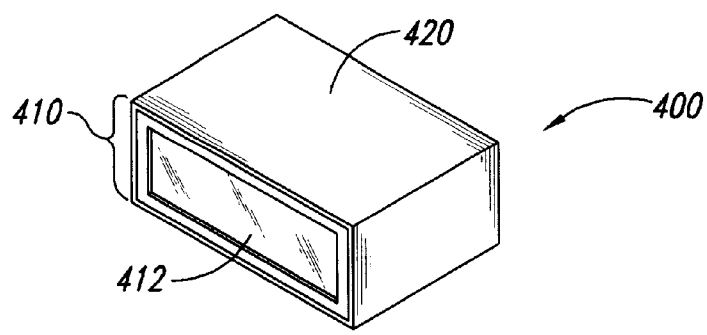
FIG. 4 is a front, top isometric drawing of an illustrated embodiment of the present invention wherein the antenna forms the reading assembly housing.

In FIG. 4, another illustrated embodiment of the present invention is shown. In this illustrated embodiment, an antenna 420 serves as a housing of an optical reading assembly 410. This embodiment further increases the efficiency of the invention by utilizing the antenna 420 as an integral part of the optical reading assembly 410. The antenna may form, for example, a vibration enclosure for the optical reading assembly, a housing for the optical reading assembly, a support structure for the optical reading assembly, or any other component or part of the optical reading assembly. The antenna may serve to protect and support the optical reading assembly.

Figure 5:
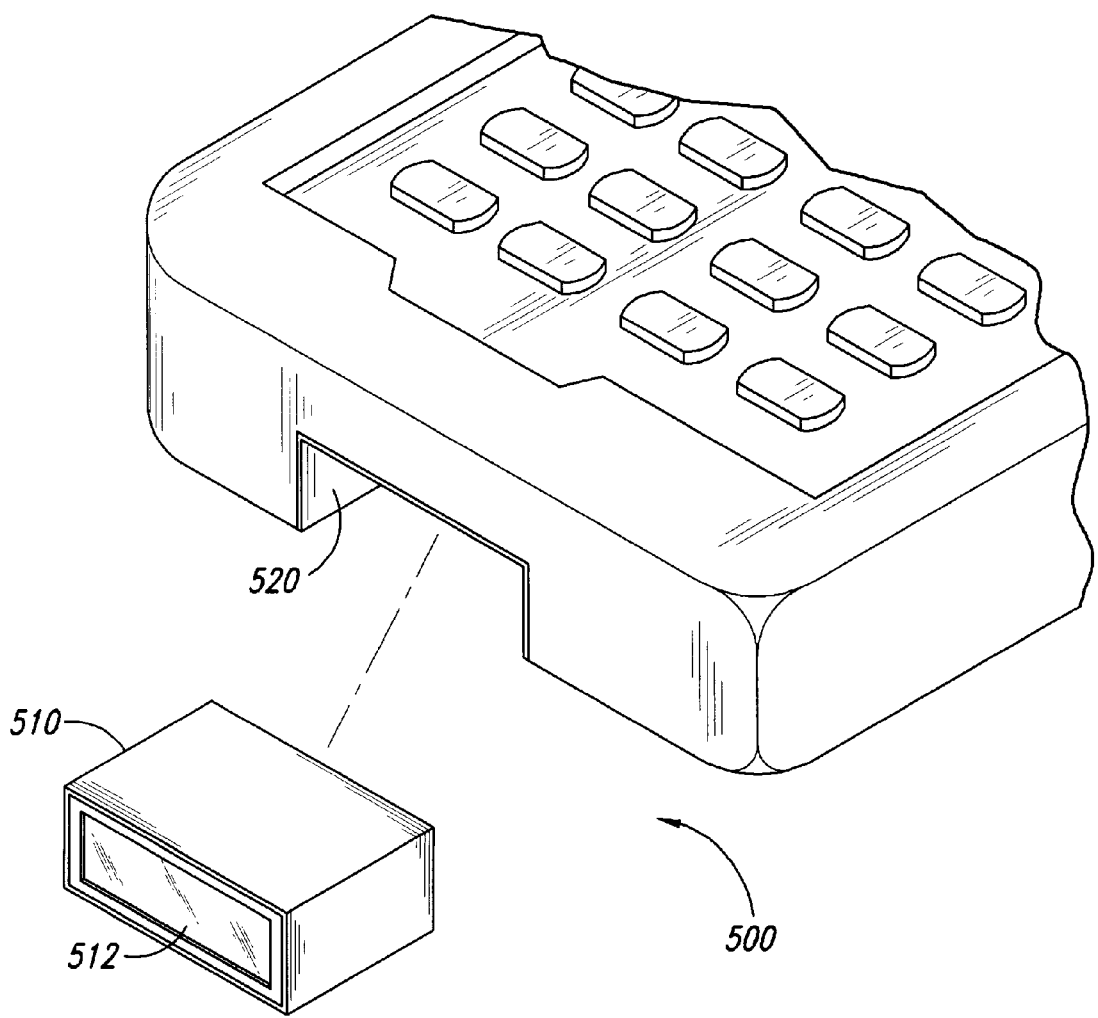
FIG. 5 is a bottom end isometric drawing of an illustrated embodiment of the present invention wherein the optical character set reading assembly is inserted into an antenna lined space on a device capable of utilizing the present invention.

In FIG. 5, another illustrated embodiment is shown. In this embodiment, the apparatus 500 has a space for inserting an optical reading assembly 510. The space is lined with an antenna 520 formed to occupy the space proximal to the optical reading assembly so that the assembly may fit into the apparatus 500. In this illustrated embodiment, the antenna 520 is formed so that the optical reading assembly 510 may be removed easily, yet still conserve space.

Figure 6:
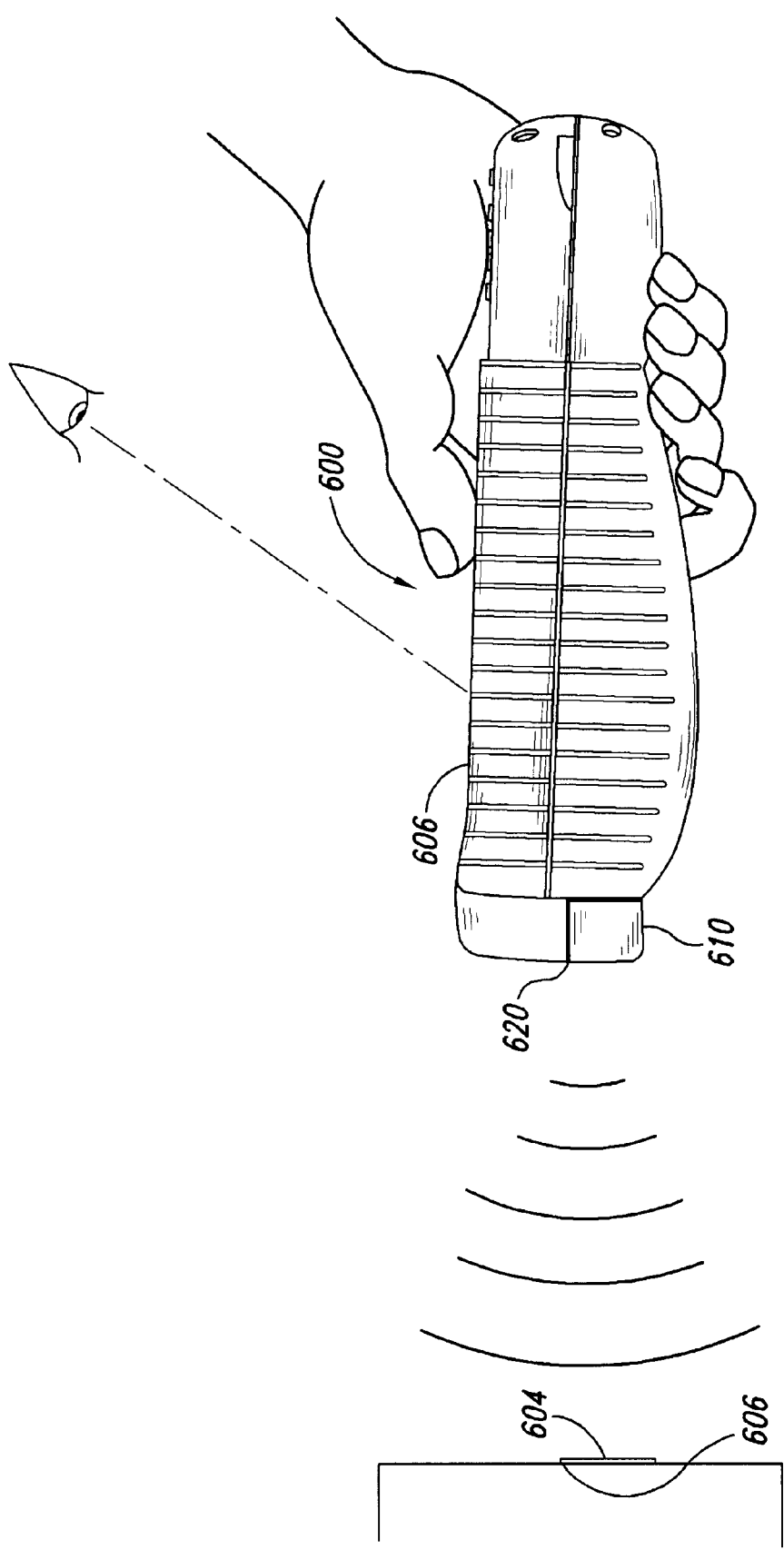
FIG. 6 is a partial drawing of a hand-held apparatus utilizing the present invention.

In FIG. 6, another illustrated embodiment is shown. In this embodiment, a hand-held data terminal 600 is capable of reading optical indicia 604 and detecting radio frequency identification transponders 606. A display 608 is utilized so that the user may read data collected by the apparatus 600 and monitor and control the operation of the reader 600. An optical reading assembly 610 and antenna 620 is positioned in the terminal. In this example, the optical reading assembly 610 is capable of reading optical indicia 604 while the antenna 620 is used to query the radio frequency transponder 606. The optical indicia 604, for example a bar code, and the radio frequency identification transponder 606 are contained as one unit that may be placed on a variety of articles. For instance, the combination tag may be placed on goods in a supermarket, warehouse, stock room, etc.

Figure 7:
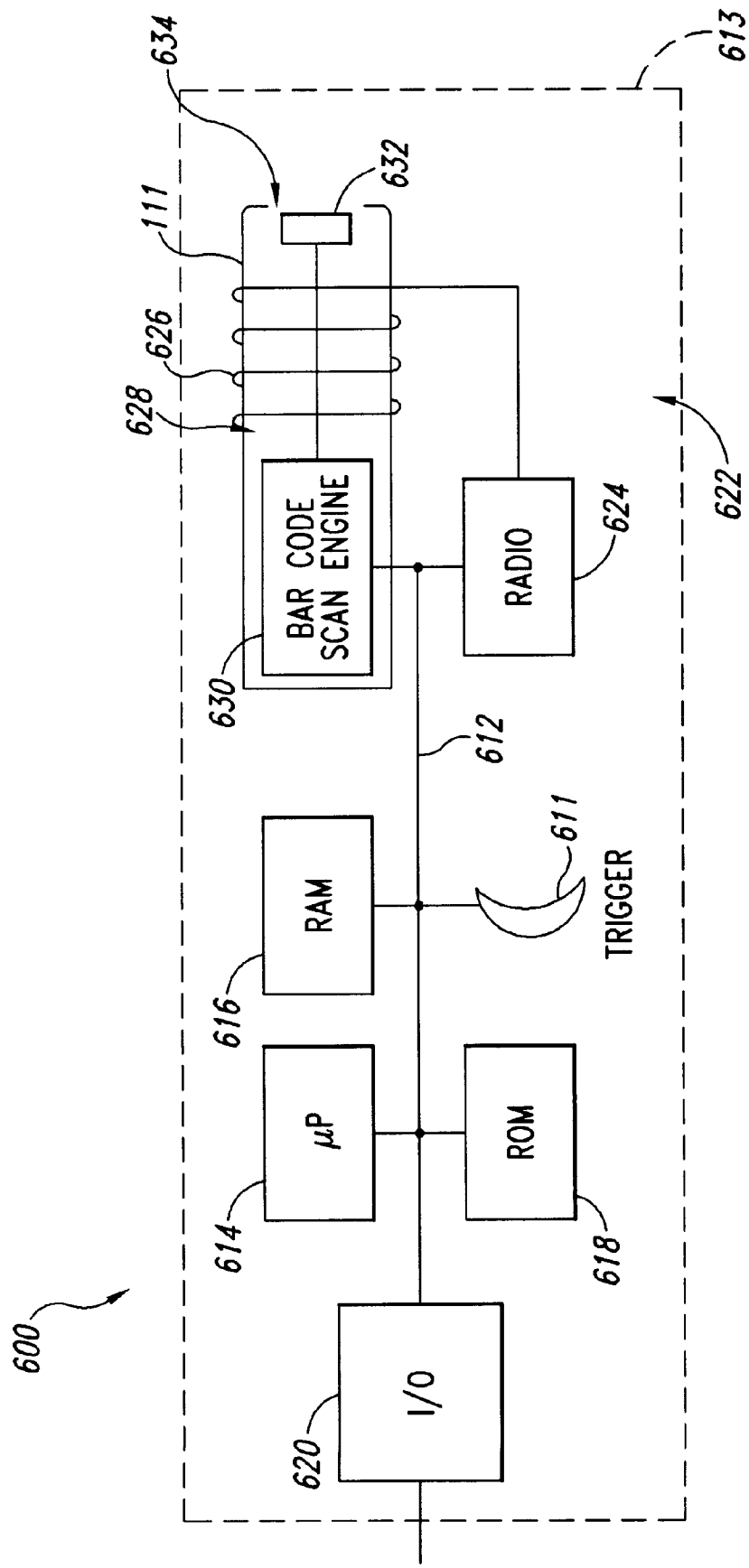
FIG. 7 is a functional block diagram of an illustrated embodiment of a reader according to the present invention.

FIG. 7 is a functional block diagram of one illustrated embodiment the device in the form of a reader 600 configured to read machine-readable symbols and RFID tags. The reader 600 may include a data and power bus 612 for coupling together the various components of the reader 600, all housed in a reader housing 613. The reader 600 may include an internal power source such as a rechargeable battery (not shown) or can receive power from an external power source such as a wall outlet by way of an electrical cord (not shown). The reader 600 includes a trigger 611 to control the reading operations. The reader 600 also includes a microprocessor 614 for controlling the various components and for processing data according to instructions stored in a random access memory ("RAM") 616 or a read-only memory ("ROM") 618. The reader 600 can include an input/output port ("I/O") 620 for allowing communications with an external device, such as an external host (not shown).

The reader 600 includes an RFID tag reader or interrogator 622 comprising, in the illustrated embodiment of FIG. 7, a radio 624 and an antenna 626. The radio 624 functions as a transceiver, producing an interrogation signal and receiving a data signal returned from the RF tag 606 (FIG. 6) in response to the interrogation signal.

As one skilled in the art will recognize, the RFID tag reading range is predominantly a factor of the antenna configuration, power and operating frequency. Hence, the radio 624 and the antenna 626 may be selected to produce a desired RFID tag reading range. For example, for a given power output and operating frequency, a particular antenna configuration may be chosen to set the RFID tag reading range at a desired value. The antenna configuration may be selected to achieve a particular focus, for example, a cone shape, rather than a typical omni-directional antenna. Examples of some suitable antenna types for varying the RFID tag reading range include magnetic inductance antennas, plane wave coupling antennas and electrostatic coupling antennas. Alternatively or additionally, the power output may be selected to achieve the desired RFID tag reading range.

Alternatively or additionally, the RFID interrogator 622 can be operable at a variety of frequencies, each frequency corresponding to a respective desired RFID tag reading range, although one skilled in the art will note that the operating frequency of the RFID interrogator 622 will often be determined by the operating frequency of the RFID tags 606 (FIG. 6).

The operating frequency will preferably be selected to avoid any permitting requirements, such as those set out by the U.S. Federal Communications Commission ("FCC"). One skilled in the art will also note that the RFID tag reading range is typically shorter than the symbol reading range of an optical reader. Therefore, the symbol reading range can be adjusted to match the RF tag reading range, such that RFID tags 606 (FIG. 6) and machine-readable symbols 604 (FIG. 6) can be acquired in a single operation without repositioning the reader 600 relative to the item carrying the data carriers. The antenna 626 should be positioned so that it does not interfere with the other components of the reader 600. The reading assembly housing can shield various components, such as the optical scanning components, from electromagnetic interference by the antenna 626.

In an alternative embodiment, the radio 624 and antenna 626 can form a wireless communications link, for example, to download collected data to a host computer (not shown), or to up load new data or instructions to the reader 600.

The reader 600 further includes an optical scanner or symbology reader 628 for reading machine-readable symbols, such as the barcode, stacked or area code symbol 604 (FIG. 6). The symbology reader 628 can include a scan engine 630 including optical elements and a transducer, such as an optical detector 632, suitable for directing light reflected from the machine-readable symbol 604 to the scan engine 630. The optical detector 632 can convert reflected light into an analog electrical signal. Suitable optical detectors includes photodiode arrays, one- and two-dimensional semi-conductor arrays, linear and two-dimensional charge coupled devices ("CCD"), and Vidicons. The scan engine 630 can also include an illumination source (not shown), such as light emitting diodes (LED) or a laser. The scan engine may additionally include moving components, such as mirrors and/or beam splitters (not shown) to scan the illumination source. The scan engine 630 may further include an analog-to-digital converter (not shown) for transforming the analog electrical signal into a digital signal to be supplied to a processor such as the microprocessor 614 for decoding Symbol readers, scan engines and optical elements are all well-known in the art and will not be discussed in further detail. Many alternatives for symbology readers, scan engines and optical elements are taught in the book *The Bar Code Book*, Third Edition, by Roger C. Palmer, Helmers Publishing, Inc., Peterborough, N.H. (1995).

As shown, the scan engine 630 including the optical detector 632 are housed in the reading assembly housing 111. The reading assembly housing 111 includes the optical window 112, that passes light reflected from the symbol 604 (FIG. 6) to the optical detector 632. The window 112 can be an opening or can include a membrane sufficiently transparent to pass light to the optical detector 632. Thus, the scan engine 630, optical detector 632, reading assembly housing 111, and antenna 626 form a module that can be easily fitted into the reader housing 613. Modularization permits readers 600 to be easily customized on the manufacturing line. Modularization also permits easy repairs or upgrades to existing readers.

The reader 600 may further include a dial, touch sensitive display, or other graphical user interface ("GUI") 608 (FIG. 6) for permitting the user to vary the power, frequency and configurations and hence vary operation of the reader 600.

Although specific embodiments of, and examples for, the invention are described herein for illustrative purposes, various equivalent modifications can be made without departing from the spirit and scope of the invention, as will be recognized by those skilled in the relevant art. The teachings provided herein of the invention can be applied to any device including an antenna and optical assembly module, not necessarily the illustrated reader generally described above. As used herein, the term radio frequency is not limited to the radio frequency portion of the electromagnetic spectrum, but can include other portions the electromagnetic spectrum for wireless communications. The term "radio" is used herein to describe any receiver, transmitter, transceiver, or other device for wireless communications in any portion of the electromagnetic spectrum.

These and other changes can be made to the invention in light of the above-detailed description. In general, in the following claims, the terms used should not be construed to limit the invention to the specific embodiments disclosed in the specification and the claims, but should be construed to include all readers that operate in accordance with the claims, Accordingly, the invention is not limited by the disclosure, but instead its scope is to be determined entirely by the following claims.

What is claimed is:

1. A symbology reader, comprising: a reader housing;
   a reading assembly housing received in the reader housing;
   an optical reading assembly mounted in the reading assembly housing;

an antenna forming a U-shaped conductive bracket sized and dimensioned to be received about a portion of the reading assembly and shaped to conform to at least a portion of a shape of the reading assembly housing, the antenna supporting the reading assembly housing; and a radio coupled to drive the antenna.

2. The symbology reader of claim 1 wherein the reading assembly housing forms a vibration resistant support having elastomeric mounts.

3. The symbology reader of claim 1 wherein the antenna is on an exterior of the reader housing to removably receive the at least a portion of the reading assembly housing.

4. A symbology reader, comprising:

a reader housing;

an optical reading assembly;

an antenna receivable in the reader housing and shaped to form at least a partial enclosure for the optical reading assembly, the optical reading assembly supportingly received within the enclosure formed by the antenna; and a radio coupled to drive the antenna.

5. The apparatus of claim 4 wherein the antenna forms a total enclosure for the optical reading assembly and includes a window to pass light to the optical reading assembly.

6. The apparatus of claim 4, further comprising:

a reading assembly housing including at least a first wall, wherein the antenna is shaped to form a second wall, the second wall having an edge adjacent an edge of the first wall to form the at least partial enclosure.

7. A module for an imager, comprising:

a housing;

an optical reading assembly received in the housing; and an antenna forming a substantially U-shaped conductive bracket sized and dimensioned to be received about at least a portion of the housing and having a shape that is complimentary to a shape of at least a portion of the housing.

8. A module for an imager, comprising:

an optical reading assembly; and an antenna receivable in the imager and shaped to form at least a partial enclosure for the optical reading assembly, the optical reading assembly supportingly received within the enclosure formed by the antenna.

9. The module of claim 8 wherein the antenna forms a total enclosure for the optical reading assembly and includes a window to pass light to the optical reading assembly.

10. The module of claim 8, further comprising:

a reading assembly housing including at least a first wall, wherein the antenna is shaped to form a second wall, a first edge of the second wall adjacent to a first edge of the first wall to form the at least partial enclosure.

11. An antenna for use in an imaging apparatus, comprising:

a conductive member having a shape at least partially conforming to a shape of a reading assembly housing and forming a substantially rectangular conductive enclosure sized and dimensioned to supportingly receive at least a portion of a reading assembly housing and having an opening formed therein the opening alienable with a window of the reading assembly housing.

12. The antenna of claim 11 wherein the antenna comprises a bracket mountable on an exterior of an imaging apparatus housing.

* * * * *